Figure 1:
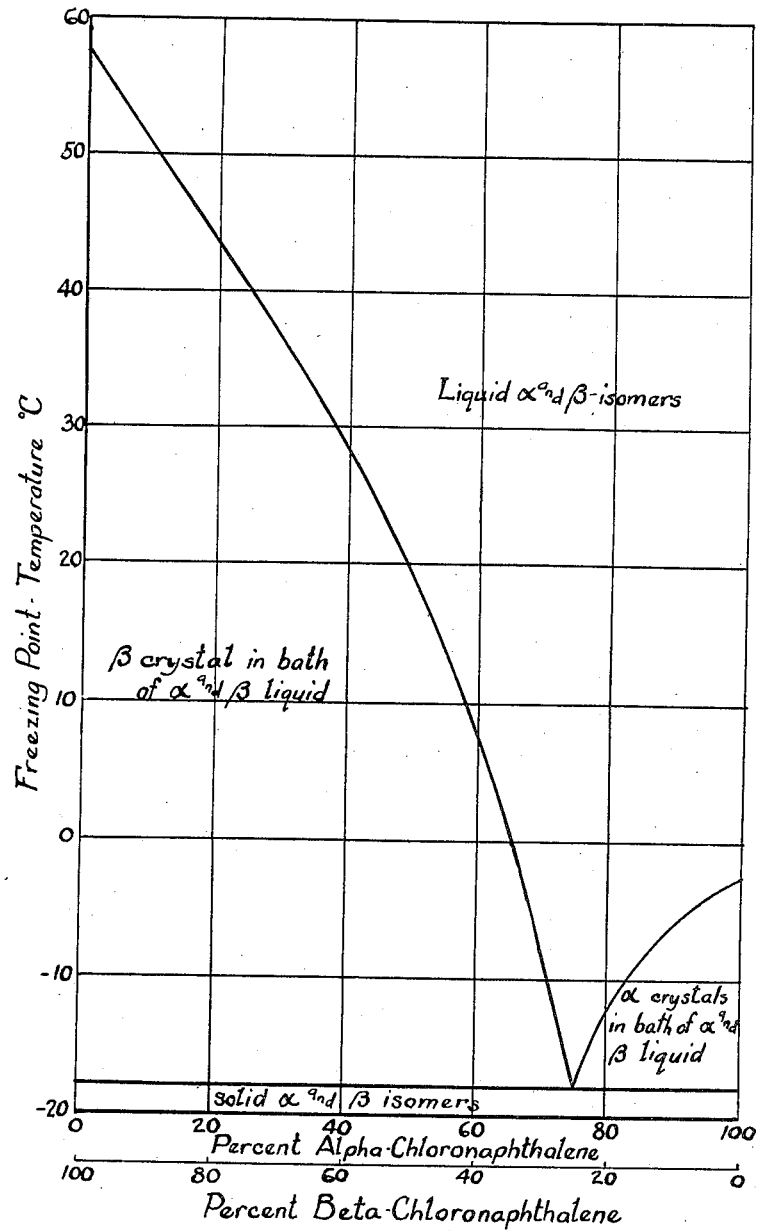

Patented July 11, 1933

1,917,822

UNITED STATES PATENT OFFICE

EDGAR C. BRITTON AND WILLIAM R. REED, OF MIDLAND, MICHIGAN, ASSIGNORS TO THE DOW CHEMICAL COMPANY, OF MIDLAND, MICHIGAN, A CORPORATION OF MICHIGAN

METHOD OF SEPARATING CHLORONAPHTHALENES

Application filed May 21, 1930. Serial No. 454,303.

The present invention relates to the separation of the alpha- and beta-monochloronaphthalenes from a mixture containing them, particularly to a method involving the crystallization of such components separately from, for instance, a crude product obtained by chlorinating naphthalene.

Monochloronaphthalene prepared by the direct chlorination of naphthalene always has been supposedly a practically pure alpha-chloronaphthalene, without the accompaniment of any of the isomeric beta compound. We have discovered, however, that such product actually consists of a mixture of the alpha- and beta-chloronaphthalenes, the latter usually being present in amount varying from 5 to 10 per cent. We have found further, that such a mixture of monochloro compounds can be separated into its components by crystallization thereof under suitable conditions, whereby the two isomeric forms may be obtained in substantially pure form. Such purification is desirable since the products thereby obtained serve as useful intermediates in the dye, pharmaceutical and related fields.

Accordingly, our invention consists of the steps and product hereinafter fully described and particularly pointed out in the claims, the annexed drawing and following description setting forth in detail certain procedure whereby the principle of our invention may be utilized.

In said annexed drawing:—

The single figure, in the form of a chart, diagrammatically shows the variation in the freezing point of mixtures comprising alpha- and beta-chloronaphthalenes.

It is impossible to separate the alpha- and beta-chloronaphthalenes by fractional distillation thereof, the boiling points of the two isomers being only a few degrees apart, viz 258° and 264° C., respectively. However, we have found that the above-mentioned monochloronaphthalenes can be separated from each other by means of controlled crystallization procedure, thereby affording a practical separation method suitable for industrial use. For instance, an oil obtained through chlorinating naphthalene and consisting substantially of a mixture of alpha- and beta-chloronaphthalenes, may be cooled sufficiently to deposit crystals of the alpha modification, a temperature of a little above $-18°$ C., being preferred. The cooling may be continued until practically all the alpha compound has been deposited, excepting that required to form an eutectic mixture with the beta isomer present. The so crystallized substantially pure alpha-chloronaphthalene may then be separated from the residual oil, for instance, by centrifuging the mixture at a temperature low enough to prevent re-solution of the crystalline alpha form. The residual oil, consisting respectively of about 75 and 25 per cent. of the alpha and beta compounds, may then be dissolved in a suitable solvent, e. g. methanol, absolute ethanol, 95 per cent. ethanol, acetone, isophopyl ether, chlorbenzene, carbon tetrachloride, or an aliphatic hydrocarbon, or a mixture thereof, and the so obtained solution cooled to about $-40°$ C., the temperature depending on the kind and amount of solvent used, whereby substantially pure beta-chloronaphthalene crystallizes out, and such beta isomer may then be separated from the residual liquid. The latter may be treated to remove either part or all of the solvent therein, and the steps repeated until the mixture of monochloronaphthalenes has been substantially separated into its components.

As an alternative procedure, the original mixture of monochloronaphthalenes may be dissolved in a suitable solvent, such as above mentioned, e. g. an alcohol, the so obtained solution cooled to about $-15°$ to $-20°$ C., crystallization induced and the thereby crystallized alpha compound separated from the residual solution. The latter containing a larger proportion of the beta isomer may then be diluted or not with more solvent and then be cooled to approximately $-30°$ to $-40°$ C., and the thereby formed beta crystals separated from the liquor.

We further have found that a eutectic mixture of alpha- and beta-chloronaphthalenes may be dissolved in one of the said solvents and a material crystallized out which contains a predominating amount of the beta form. This material may then be further crystallized from a solvent to obtain the components thereof.

The following examples illustrate ways in which our invention can be used:—

Example 1

500 grams of monochloronaphthalene, freezing at −5° C., and containing respectively about 92 per cent and 8 per cent of the alpha and beta isomers, was cooled to about −15° C., crystallization induced, and the crystals separated from the liquid by centrifuging. 340 grams of substantially pure alpha-chloronaphthalene, melting at −2.5° C, were obtained, together with 160 grams of an oil consisting respectively of about 75 per cent and 25 per cent of the alpha and beta modifications. Said latter oil was dissolved in four times its weight of ethanol, and cooled to about −40° C., whereby 30 grams pure beta-chloronaphthalene was crystallized and obtained by filtration of the solution. The latter, which now contained respectively about 120 grams and 10 grams of the alpha and beta compounds, was substantially freed of solvent by evaporation thereof and the above steps were repeated until after three repetitions of crystallization without a solvent followed by crystallization from a solvent, the residual oil was reduced to about 20 grams.

Example 2

1190 grams of monochloronaphthalenes, of the same composition as used in the first example, was dissolved in 500 cc. methanol, cooled to below 0° C., seeded with a crystal of alpha-chloronaphthalene, and finally cooled to −16° C. The alpha-chloronaphthalene which crystallized from the solution, was separated from the latter by centrifuging the same, and then washed with 200 cc. of methanol at a temperature of approximately −10° C. A yield of 805 grams purified alpha compound melting at −2.5° C., was obtained. The beta compound was obtained from the residue by adding additional solvent and proceeding as in Example 1.

With mixtures in which the alpha isomer largely predominates the preferred procedure will be to separate first the alpha isomer whereby the residual solution is enriched in the beta isomer. With mixtures approximating the eutectic composition suitable dilution with a solvent followed by cooling will permit separation of either alpha or beta isomers depending upon composition, dilution and temperature. With mixtures rich in the beta isomer, such isomer may be first separated and then the alpha isomer separated from the so enriched solution. Alternative procedures are also available as illustrated in the examples.

The melting point of alpha-chloronaphthalene has never been recorded in the literature, although that of the corresponding beta compound, viz. 57° C., is known. We have found that the melting point of the best commercial alpha compound, as produced according to the well known methods, does not exceed −5° C. However, the recrystallized pure alpha-chloronaphthalene obtained by our new procedure, is found to have a somewhat higher melting point, viz. −2.5° C., such property thereby affording a readily available and accurate means of determining the purity of the alpha compound. Purified alpha-chloronaphthalene, as obtained through our process, boils at 258.8° C. at 753 millimeters pressure and has the specific gravity 1.192 at 25° C. with respect to water at 4° C.

Our invention, then, involves methods for the separation of a mixture of alpha- and beta-chloronaphthalenes into components thereof, whereby the latter are obtained in substantially pure form, and further, the purification of alpha-chloronaphthalene resulting from chlorination of naphthalene.

Other modes of applying the principle of our invention may be employed instead of the one explained, change being made as regards the details, provided the step or steps stated by any of the following claims or equivalent thereof be employed.

We therefore particularly point out and distinctly claim as our invention:—

1. The method of separating alpha- and beta-chloronaphthalenes from a mixture of said compounds in non-eutectic proportions, which mixture may also contain a volatile and substantially inert organic solvent, which comprises crystallizing one of the isomeric chloronaphthalenes by cooling the mixture, separating the crystals from the liquid, adjusting the quantity of organic solvent in the mother liquor to such proportion that the isomer which remained dissolved during the above described crystallization is least soluble of the two isomers remaining in the said mother liquor, and cooling the resultant solution to crystallize the second isomer.

2. The method of separating alpha- and beta-chloronaphthalenes from a mixture thereof containing alpha-chloronaphthalene in greater than eutectic proportion, which comprises crystallizing out alpha compound by cooling said mixture, separating the crystals from the liquid, and then crystallizing out beta compound by cooling the residual mixture of alpha and beta compounds dissolved in a lower alcohol.

3. The method of separating alpha- and beta-chloronaphthalenes from a mixture thereof containing alpha-chloronaphthalene in greater than eutectic proportion, which comprises crystallizing out alpha compound by cooling said mixture, separating the crystals from the liquid, and then crystallizing out beta compound by cooling the residual mixture of alpha and beta compounds dissolved in methyl alcohol.

4. The method of separating alpha- and beta-chloronaphthalenes from a mixture thereof containing alpha-chloronaphthalene in greater than eutectic proportion, which comprises crystallizing out alpha compound by cooling said mixture to about −15° C., separating the crystals from the liquid, and then crystallizing out beta compound by cooling the residual mixture of alpha and beta compounds dissolved in methyl alcohol to a temperature of about −30° to −40° C.

5. The method of separating alpha- and beta-chloronaphthalenes from a solution thereof in a volatile and substantially inert organic solvent, which solution initially contains alpha-chloronaphthalene in greater than eutectic proportion, which comprises crystallizing out alpha-chloronaphthalene by cooling the solution, separating the crystals from the liquid, diluting the mother liquor with a volatile and substantially inert organic solvent, and crystallizing out beta-chloronaphthalene by cooling the resultant solution.

6. The method of separating alpha- and beta-chloronaphthalenes from a solution thereof in a lower aliphatic alcohol, which solution initially contains alpha-chloronaphthalene in greater than eutectic proportion, which comprises crystallizing out alpha-chloronaphthalene by cooling the solution, separating the crystals from the liquid, diluting the mother liquor with an additional quantity of a lower aliphatic alcohol, and crystallizing out beta-chloronaphthalene by cooling the resultant solution.

7. The method of separating alpha- and beta-chloronaphthalenes from a solution thereof in methyl alcohol, which solution initially contains alpha-chloronaphthalene in greater than eutectic proportion and contains methyl alcohol in amount representing not more than about 30 per cent of the combined weight of the isomeric chloronaphthalene which comprises crystallizing out alpha-chloronaphthalene by cooling said solution to a temperature between about −15° and −20° C., separating the crystals from the liquid, diluting the mother liquor with additional methyl alcohol, and crystallizing out beta-chloronaphthalene by cooling the resultant solution to a temperature between about −30° and about −40° C.

8. In a method for the purification of alpha-chloronaphthalene, the step which consists in cooling a mixture of isomeric monochloronaphthalenes, containing alpha-chloronaphthalene in greater than eutectic proportion, to a temperature at which alpha-chloronaphthalene crystallizes therefrom.

9. In a method for the purification of alpha-chloronaphthalene, the step which consists in cooling an alcoholic solution of isomeric mono-chloronaphthalenes, containing alpha-chloronaphthalene in greater than eutectic proportion, to a temperature at which alpha-chloronaphthalene crystallizes therefrom.

10. In a method for the purification of alpha-chloronaphthalene, the steps which consist of crystallizing the same from a mixture of isomeric mono-chloronaphthalenes, containing alpha-chloronaphthalene in greater than eutectic proportion until only enough of the alpha compound remains in the mixture to form a eutectic compound with the beta isomer present, and separating the beta isomer by crystallizing the same from a solution of the said eutectic in a volatile substantially inert solvent.

11. As an article of manufacture, alpha-chloronaphthalene in such a state of purity as to have a melting point of −2.5° C., a boiling point of 258.8° C. under 753 millimeters pressure, and a specific gravity of 1.192 at 25° C. with respect to water at 4° C.

12. The method of separating alpha- and beta-choloronaphthalenes from a mixture thereof containing alpha-choloronaphthalene in greater than eutectic proportion, which mixture may also contain a volatile and substantially inert organic solvent, which comprises crystallizing out alpha-chloronaphthalene by cooling said mixture, separating the crystals from the liquid, diluting the mother liquor with a volatile and substantially inert organic solvent, and crystallizing out beta-chloronaphthalene by cooling the resultant solution.

Signed by us this 15th day of May, 1930.

EDGAR C. BRITTON.
WILLIAM R. REED.